H. F. PIETSCH.
WHEAT HEATER.
APPLICATION FILED MAY 28, 1906.
912,322.
Patented Feb. 16, 1909.
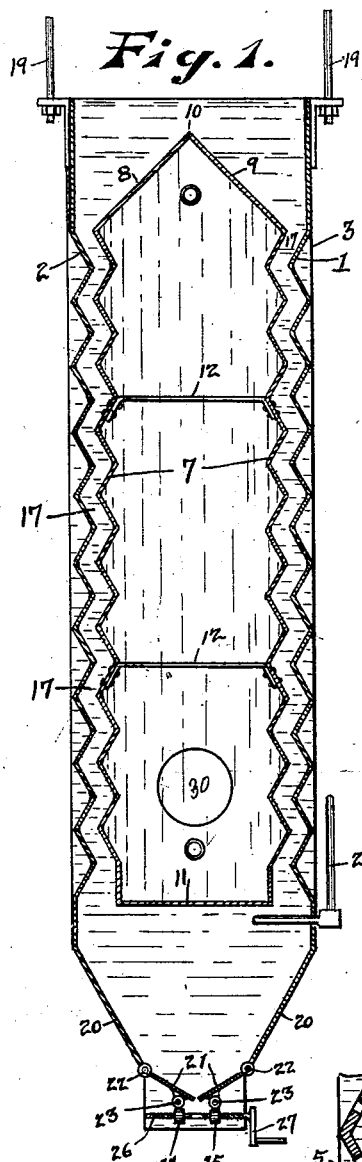
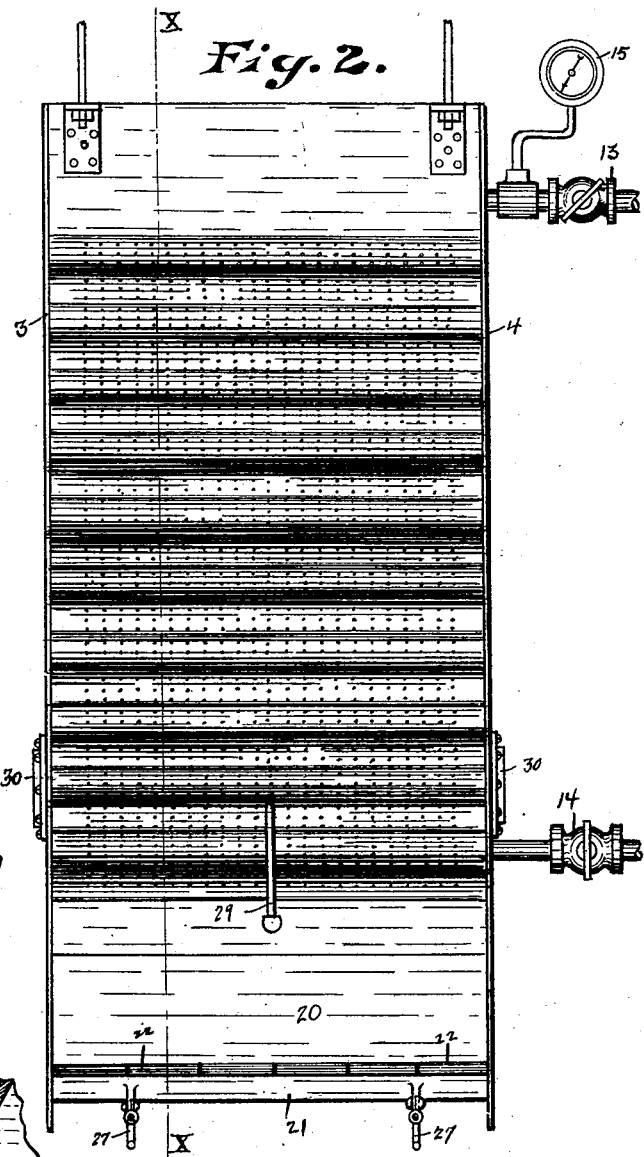
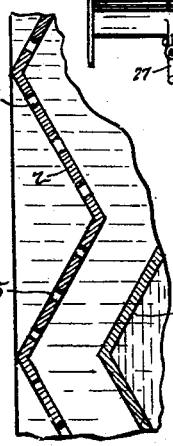
WITNESSES:
INVENTOR.
Herman F. Pietsch
BY Erwin & Wheeler
ATTORNEYS.

UNITED STATES PATENT OFFICE.

HERMAN F. PIETSCH, OF MILWAUKEE, WISCONSIN.

WHEAT-HEATER.

No. 912,322.  Specification of Letters Patent.  Patented Feb. 16, 1909.

Application filed May 28, 1906. Serial No. 319,051.

*To all whom it may concern:*

Be it known that I, HERMAN F. PIETSCH, a citizen of the United States, residing at Milwaukee, county of Milwaukee, and State of Wisconsin, have invented new and useful Improvements in Wheat-Heaters, of which the following is a specification.

My invention relates to improvements in wheat heaters.

The object of my invention is to provide a form of construction in which the wheat will be thoroughly heated and aerated, the heating operation being expedited and the grain put in better condition for grinding by a construction of the apparatus, which permits and produces a continuous circulation of air from the exterior through the grain while being heated.

My invention also has in view the provision of improved means for regulating the flow of grain through the device.

In the following description, reference is had to the accompanying drawings, in which—

Figure 1 is a vertical sectional view of my invention drawn on line $x$—$x$ of Fig. 2. Fig. 2 is a side view of the same. Fig. 3 is a detail view on an enlarged scale of one of the outer walls, showing the perforations. Fig. 4 shows a modified form of outer wall.

Like parts are identified by the same reference characters throughout the several views.

The wheat is passed through a main chamber having zigzag side walls 1 and 2 and end walls 3 and 4, the ends of the side walls being preferably extended in vertical planes as shown. The zigzag portions of the walls are formed with perforations 5 adapted to permit a free circulation of the air through the wall. Zigzag partitions 7 extend across the chamber between the end walls and in position, substantially parallel with the outer walls 1 and 2 of the chamber. The upper margins of the wall 7 are connected to walls 8 and 9 respectively, which diverge from an apex 10 to the respective partition walls. The lower margins of the partition walls are connected by a floor 11. Braces 12 may be employed at suitable intervals to strengthen the partitions, which with the walls 8 and 9 and bottom wall 10 form a closed steam chamber. Steam is admitted to the steam chamber through a valved pipe connection 13 and discharges therefrom through a valved pipe connection 14. A steam gage 15 is preferably employed to ascertain the degree of pressure in the chamber. The wheat is delivered by any suitable means into the upper portion of the main chamber and is deflected by the walls 8 and 9 into the zigzag passages 17 between the walls 1 and 2 and the parallel partition walls 7. As the wheat passes downwardly in these passages 17, it is continually stirred and the individual grains turned by the abrupt changes of direction in the passages and air are alternately drawn in and forced out through the perforations. The wheat settling away from the over-hanging portion of the wall tends to draw in air and this air is subsequently forced out through the perforations in a downwardly and inwardly extending portion of the wall. A constant circulation of air through the grain is thus secured.

At the lower end of the main chamber, the grain is collected by converging walls 20 and delivered through an opening in the bottom of the chamber. The flow of grain through this opening is controlled by valves 21, which are hinged at 22 to the respective side walls 20 and which also have jointed connection at 23 with nuts 24 and 25, adjusted to a right and left screw threaded rod 26, provided with a crank 27. By turning the rod, the valves 21 may be opened or closed as the ends move outwardly or inwardly on the rod. The degree of heat is ascertained by means of a thermometer 29 and the valves 21 are adjusted to increase or diminish the rate of flow until the desired heating and drying operation is secured.

Various modifications of structure may be provided without departing from the scope of my invention. I attach great importance, however, to the provision of means for deflecting the wheat, combined with means for permitting the wheat to draw in and force out air from the exterior in at least a portion of the passage.

The walls 3 and 4 are preferably provided with doors 30 covering hand holes, which permit the insertion of a lamp, stove or other form of heater where steam cannot be obtained.

The steam pipe connections may be left open to promote circulation where a lamp or stove is in use.

In Fig. 4 I have illustrated a modified form of outer wall consisting of an ordinary perforate screen or wire net $1^a$.

Having thus described my invention what I claim as new and desire to secure by Letters Patent is,

1. In a wheat heater, the combination of substantially parallel zigzag walls; means for heating one of said walls, the other of said walls being perforated and exposed to the outer air, to permit air from the exterior to enter that space between the walls.

2. In a wheat heater, the combination of a steam chamber provided with zigzag side walls; an inclosing chamber provided with perforated zigzag walls, substantially parallel with the walls of the steam chamber and arranged to form passages between them, the upper end of the steam chamber being arranged to direct grain into such passages.

3. In a wheat heater, the combination of a steam chamber provided with zigzag side walls; an inclosing chamber provided with perforated zigzag walls, substantially parallel with the walls of the steam chamber and arranged to form passages between them, the upper end of the steam chamber being arranged to direct grain into such passages; together with exit valves at the lower end of said chamber; right and left screw threaded rods having nuts connected with the respective valves; and means for rotating said rods to adjust the valves and regulate the flow of grain through said passages.

In testimony whereof I affix my signature in the presence of two witnesses.

HERMAN F. PIETSCH.

Witnesses:
LEVERETT C. WHEELER,
ALBERT PIETSCH.